United States Patent
Kuroyama et al.

[19]

[11] Patent Number: 5,882,754

[45] Date of Patent: Mar. 16, 1999

[54] CAST-COATED PRESSURE-SENSITIVE ADHESIVE SHEET FOR INK JET RECORDING

[75] Inventors: Yoshihiro Kuroyama; Tomonobu Ohmura; Takashi Ueno; Yoichi Yamazaki; Eiki Kobayashi, all of Tokyo, Japan

[73] Assignee: Nippon Paper Industries Co., Ltd., Japan

[21] Appl. No.: 853,450

[22] Filed: May 9, 1997

[30] Foreign Application Priority Data

May 10, 1996 [JP] Japan .................................. 8-140886

[51] Int. Cl.$^6$ ..................................... B41M 5/00
[52] U.S. Cl. ......................... 428/41.8; 428/195; 428/211; 428/342
[58] Field of Search .......................... 347/105; 428/195, 428/211, 41.8, 340–343, 352, 354

[56] References Cited

FOREIGN PATENT DOCUMENTS

| 634283 | 1/1995 | European Pat. Off. | ............... 428/195 |
| 634285 | 1/1995 | European Pat. Off. | ............... 428/195 |
| 707977 | 4/1996 | European Pat. Off. | ............... 428/195 |

*Primary Examiner*—Bruce H. Hess
*Attorney, Agent, or Firm*—Millen, White, Zelano, & Branigan, P.C.

[57] ABSTRACT

Provided is a cast-coated pressure-sensitive adhesive sheet which hardly causes a curling trouble after ink jet recording which comprises a cast-coated recording paper, a pressure-sensitive adhesive layer and a release coated paper laminated via the pressure-sensitive adhesive layer on the side opposite to the recording layer, with the adhesive sheet having a difference between the two characteristic values (A) and (B) within the range of 0.00 to 0.10%, expressed in absolute value, wherein the characteristic value (A) is an irreversible shrinkage factor of the cast-coated recording paper in the CD direction determined under an environment that the relative humidity thereof is raised to 90% from 35% and then lowered to 35% and the characteristic value (B) is a shrinking rate of the release coated paper in the CD direction determined under a condition that the relaltive humidity of the environment is changed from 75% to 60% in the course of lowering the relative humidity from 90% to 35%.

10 Claims, No Drawings

CAST-COATED PRESSURE-SENSITIVE ADHESIVE SHEET FOR INK JET RECORDING

FIELD OF THE INVENTION

The present invention relates to a cast-coated pressure-sensitive adhesive sheet suitable for ink jet recording with water base ink and, more particularly, to a cast-coated pressure-sensitive adhesive sheet which ensures high quality and high gloss in the images formed thereon by means of an ink jet recording system and hardly causes a curling trouble by ink jet recording thereon with water base ink.

BACKGROUND OF THE INVENTION

In an ink jet recording method, recording is carried out by jetting fine drops of ink using a variety of mechanisms so as to adhere to a recording paper, and thereby forming ink dots on the recording paper. Therefore, the recording method of ink jet type has advantages in that it is noiseless, can provide full-color prints with ease and enables high-speed printing, compared with the recording method of dot impact type. However, it also has a weak point that printed ink is hard to dry since the ink used for ink jet recording is usually water base ink.

Thus, the paper used in the ink jet recording method is required to have properties of (1) ensuring high-speed drying of ink, (2) providing prints of high optical density, (3) being free from overflowing and feathering of ink, (4) not causing undulation by the absorption of ink, and so on.

It has already been proposed to produce an ink jet recording paper by adopting a cast coating method, thereby answering the above-mentioned requirements to provide printed images of high quality. By using a cast-coated paper as ink jet recording paper, the rippling trouble which has been caused in paper due to expansion just after printing, or the so-called cockling, can be lessened (Japanese Tokkai Sho 62-95285, wherein the term "Tokkai" as used herein means an "unexamined published patent application").

As for the cast coating method, the following three types of processes have so far been known:

(1) a direct process in which the applied coating color in a wet condition is pressed against the hot drum having a mirror-ground surface and undergoes a drying operation, thereby copying the specular plane from the drum surface;

(2) a re-wetting process in which, after the coating color applied in a layer is once dried, a wetting solution is applied to the dried layer to make the layer surface plastic and return it to the wet state, and then the resultant layer is pressed against the hot drum having a mirror-ground surface and undergoes a drying operation, thereby copying the specular plane from the drum surface; and (3) a coagulation process in which, immediately after a coating color is applied in a layer, the layer is coagulated with a coagulating solution and then pressed against the hot drum having a mirror-ground surface and undergoes a drying operation, thereby copying the specular plane from the drum surface.

That is, in every process of producing a highly glossy cast-coated paper, the copying of a specular plane is effected by pressing the coating color layer against the hot drum having a mirror-ground surface while it is in a wet state and drying it in the pressed condition. Therein, the paper in a wet state is dried as it is stretched on the drum, namely it undergoes tension drying under a bound condition. Therefore, the paper obtained can have excellent dimensional stability.

However, such a cast-coated paper for ink jet recording is attended with a defect of causing curling and rippling troubles during the standing after printing because the paper suffers shrinkage due to difference in the amount of ink applied and recorded area.

In a case where such a cast-coated paper for ink jet recording is used as a substrate to constitute the front part of a pressure-sensitive adhesive sheet, the cast-coated paper part of the pressure-sensitive adhesive sheet shrinks accordingly as the ink printed thereon is dried by leaving the sheet in air, while the release coated paper part of the pressure-sensitive adhesive sheet scarcely causes any dimensional change because the ink used in ink jet recording, in general, cannot permeate into the release coated paper. Therefore, when the irreversible shrinkage takes place to liberate the distortion from the inside of the cast-coated paper, the printed face of the paper generally curls inward with the curling axis coincident with the MD direction (The term "MD direction" as used herein stands for the paper traveling direction in a paper machine, usually called machine direction). As a result, the cast-coated pressure-sensitive adhesive sheet printed thereon by ink jet recording curls so as to direct the cast-coated paper part inward.

Such a curling trouble as described above is serious in the case of using a high-speed ink jet printer which is equipped with a heating roller or infrared heater for rapid drying of the printed ink. In particular, when the system of heating the recorded face from the back side is adopted in the ink jet printer used, the expansibility of a release coated paper forms an important factor, too; as a result, the cast-coated pressure-sensitive adhesive sheet tends to curl with the curling axis coincident with the MD direction, thereby causing traveling troubles. Such a curling trouble, however, cannot be obviated even by a mechanical method using, e.g., a decurler which is known to be effective for the removal of the curling in the CD direction (The term "CD direction" used herein stands for the direction crossing with the machine direction at right angles, usually called cross machine direction). In other words, no effective means to prevent the curling in the MD direction has been found yet (The term "MD direction" stands for the machine direction).

SUMMARY OF THE INVENTION

Therefore, a first object of the present invention is to provide a cast-coated pressure-sensitive adhesive sheet for ink jet recording which ensures excellent characteristics in images printed thereon and has curls very considerably reduced in magnitude after printing.

The aforementioned object is attained by a cast-coated pressure-sensitive adhesive sheet for ink jet recording which comprises (1) a cast-coated recording paper having a recording layer provided on one side of a base paper according to a cast coating method, (2) a pressure-sensitive adhesive layer provided on the other side of the base paper and (3) a release coated paper laminated via the pressure-sensitive adhesive layer on the side opposite to the recording layer, with the sheet having a difference between the two characteristic values (A) and (B) within the range of 0.00 to 0.10%, expressed in absolute value, wherein the characteristic value (A) is an irreversible shrinkage factor of the cast-coated recording paper in the CD direction determined under an environment that the relative humidity thereof is raised to 90% from 35% and then lowered to 35% (namely, under a humidity change of 35% RH→90% RH→35% RH) and the characteristic value (B) is a shrinking rate of the release coated paper in the CD direction determined under a condition that the relaltive humidity of the environment is changed from 75% to 60% in the course of lowering the relative humidity from 90% to 35%.

DETAILED DESCRIPTION OF THE INVENTION

For the present pressure-sensitive adhesive sheet, it is important to balance the dimensional stability of a release coated paper against the irreversible shrinkage factor of a cast-coated paper for ink jet recording which is used as a substrate forming the front part of the pressure-sensitive adhesive sheet. Specifically, the present pressure-sensitive adhesive sheet is required to have within the range of 0.00 to 0.10%, preferably from 0.00 to 0.07%, expressed in absolute value, the difference between (A) the irreversible shrinkage factor of the cast-coated recording paper in the CD direction, which is determined under an environment that the relative humidity thereof is raised to 90% from 35% and then lowered to 35%, and (B) the shrinking rate of the release coated paper in the CD direction determined under a condition that the relative humidity of the environment is changed from 75% to 60% in the course of lowering the relative humidity from 90% to 35%.

For the cast-coated recording paper as one constituent of the present pressure-sensitive adhesive sheet, it is desirable to have the above-defined irreversible shrinkage factor in the CD direction within the range of 0.080 to 0.350%, preferably 0.100 to 0.300%.

For the release coated paper as another constituent of the present pressure-sensitive adhesive sheet, it is desirable to have the above-defined shrinking rate in the CD direction within the range of 0.100 to 0.350%, preferably 0.170 to 0.270%.

The pulp used for making the base paper of the present cast-coated paper for ink jet recording can be selected properly from those generally used in paper making, such as hardwood- or softwood-made chemical pulp, mechanical pulp and deinked pulp.

The foregoing base paper can contain an internal filler. Such a filler can be selected properly from the fillers generally used for paper-making, e.g., talc, kaolin, calcium carbonate, titanium dioxide and so on.

On one side of a base paper as described above, a recording layer is formed by applying thereto a coating color. The coating color used in the present invention comprises at least a pigment and a binder for holding the pigment on the base paper. The pigment used for the coating color can be properly selected from known pigments, with examples including amorphous silica, kaolin, calcium carbonate, alumina, aluminum hydroxide, magnesium carbonate, satin white, aluminum silicate, colloidal silica and montmorillonite. These pigments can be used as a mixture of two or more thereof.

Also, the binder used in the present recording layer can be properly selected from known binders, with examples including casein, soybean protein, starch, polyvinyl alcohol, carboxymethyl cellulose, a styrene-butadiene latex, an acrylic emulsion, a vinyl acetate emulsion and polyurethane. These binders can be used alone or as a mixture of two or more thereof.

To the recording layer can be added various auxiliary agents used for conventional coating colors, such as a dispersing agent, a flowability modifier, a defoaming agent, a dye, a lubricant and a water-holding agent.

The method of applying the coating color as mentioned above can be properly selected from the coating methods using known coating machines, such as a blade coater, an air knife coater, a roll coater, a kiss coater, a squeegee coater, a curtain coater, a bar coater, a gravure coater and a comma coater.

The coverage rate of the recording layer can be adjusted arbitrarily as far as it is enough to cover the whole surface of a base paper and ensure sufficient ink absorption, but it is desirable for the present recording layer to have the coverage rate within the range of 5 to 30 g/m$^2$, preferably 10 to 25 g/m$^2$, on a solids basis.

The present recording layer is provided using a cast coating method. In particular, when the cast coating is carried out in accordance with a coagulation process, various salts formed from metals, e.g., calcium, zinc, barium, lead, magnesium, cadmium and aluminum, and acids, e.g., formic acid, acetic acid, citric acid, tartaric acid, lactic acid, hydrochloric acid and sulfuric acid; potassium sulfate; potassium citrate; borax; boric acid; and so on can be used as a coagulant.

According to the cast coating method, the copying of a specular plane onto the surface of a coating color layer is generally effected by pressing the coating color layer against a drum heated at around 100° C. and having a mirror-ground cylindrical external surface while it is in a wet state and drying it at the same time.

On the back side of the thus prepared cast-coated paper, a pressure-sensitive adhesive layer and a release coated paper are provided using, e.g., a transfer coating process wherein a pressure-sensitive adhesive is coated and dried on a paper treated with a release agent such as a silicone resin and then bonded to a cast-coated paper as the substrate to constitute the front part of the pressure-sensitive adhesive sheet, or a direct coating process wherein a pressure-sensitive adhesive is coated and dried on the substrate to constitute the front part of the pressure-sensitive adhesive sheet and then bonded to a release coated paper.

The pressure-sensitive adhesive used for forming the pressure-sensitive adhesive layer can be selected properly from known solvent-base or water-base adhesives. And the release coated paper used in the present invention can be selected properly from known release coated papers wherein polyethylene-laminated glassine paper, wood free paper and so on are used as base paper and coated with a release agent such as a silicone resin.

The irreversible shrinkage factor of a cast-coated paper used in the present pressure-sensitive adhesive sheet can be adjusted, e.g., by properly choosing the drying condition in the paper-making process and the ingredients of a paper stock used. On the other hand, the adjustment of the shrinking rate of a release paper used in the present invention can be effected by properly choosing the freeness of pulp used in a paper stock, the filler content in a paper stock and the drying condition in the paper making process.

More specifically, the present cast-coated pressure-sensitive adhesive sheet having ink jet recording suitability can be prepared by laminating a release coated paper on the base paper side of a cast-coated paper having ink jet recording suitability, which has a recording layer provided by a cast coating method on one side of the base paper, via a pressure-sensitive adhesive layer, wherein the irreversible shrinkage factor of the cast-coated recording paper in the CD direction, which is determined under an environment that the relative humidity thereof is raised to 90% from 35% and then lowered to 35%, and the shrinking rate of the release coated paper in the CD direction, which is determined under a condition that the relative humidity of the environment is changed from 75% to 60% in the course of lowering the relative humidity from 90% to 35%, are controlled so that the difference between them are within the range of 0.00 to 0.10%, preferably from 0.00 to 0.07%, expressed in absolute value.

The present cast-coated pressure-sensitive adhesive sheet not only ensures high quality and gloss in the images printed thereon but also has very satisfactory reduction in the curling due to standing after printing with an ink jet printer equipped with a dryer.

The present invention will now be illustrated in more detail by reference to the following examples. However, the invention should not be construed as being limited to these examples. Unless otherwise noted, all "%" and all "parts" in the examples are by weight.

EXAMPLE 1

Preparation of Coating Color for Recording Layer

A water-base coating material having a solids concentration of 30% was prepared. Therein, the solids were constituted of, as pigments, 80 parts of synthetic silica (Mizukasil P-78F, trade name, a product of Mizusawa Industrial Chemicals, Ltd.) and 20 parts of precipitated calcium carbonate (Tamapearl 121, trade name, a product of Okutama Kogyo Co., Ltd.), as binders, 30 parts of casein (Lactic Casein, made in New Zealand) and 20 parts of polyvinyl alcohol (PVA 117, trade name, a product of Kraray Co., Ltd.) and, as a mold lubricant, 3 parts of calcium stearate (Nopcoat C-104, a trade name, a product of San Nopco Ltd.).

Preparation of Coagulating Solution

A coagulating solution was prepared, in which 10% of calcium formate as a coagulant and 3% of polyethyleneimine quaternary ammonium salt were contained.

Preparation of Cast-Coated Paper for Ink Jet Recording

A paper stock containing as solids components 83 parts of LBKP with a Canadian standard freeness of 310 ml, 17 parts of precipitated calcium carbonate, 0.05 part of a sizing agent (alkylketene dimer), 1.0 part cationized starch, 0.2 part of paper strength reinforcing agent and 0.05 part of a retention aid was adjusted to a concentration of 0.03%, and therefrom a raw paper was made by means of a Fourdrinier machine of multi-cylinder type. In the course of paper-making, starch was coated at a dry coverage of 2 g/m$^2$ by means of a size press. Thus, a wood free paper having a basis weight of 110 g/m$^2$ was obtained.

On one side of the thus obtained wood free paper, the coating color prepared above for a recording layer was coated at the coverage of 14 g/m$^2$ on a solids basis by means of a roll coater, and further the coagulation solution prepared above was applied thereto using the roll coater. Then, the coated surface was pressed against a cast drum heated at 100° C. while it was in a wet condition, and then dried. The thus obtained cast-coated paper for ink jet recording had an irreversible shrinkage factor of 0.29%.

The thus obtained cast-coated paper was bonded to a release coated paper having a shrinking rate of 0.20% which had been coated with an adhesive of acryl emulsion type at a dry coverage of 18 g/m$^{2\cdot}$ thereby obtaining a cast-coated pressure-sensitive adhesive sheet for ink jet recording.

Additionally, the foregoing irreversible shrinkage factor and shrinking rate were determined by the methods described hereinafter, respectively.

EXAMPLE 2

A cast-coated pressure-sensitive adhesive sheet for ink jet recording was prepared in the same manner as in Example 1, except that the same wood free paper as made in Example 1 was coated with water on one side by means of a bar coater and then dried with a hot-air dryer prior to the formation of the recording layer by coating the coating color and subjecting it to the cast coating process.

Additionally, the irreversible shrinkage factor of the cast-coated paper prepared as a substrate forming the front part of the adhesive sheet was 0.18%.

EXAMPLE 3

A cast-coated pressure-sensitive adhesive sheet for ink jet recording was prepared in the same manner as in Example 2, except that the release coated paper having a shrinking rate of 0.25% was used in place of that having a shrinking rate of 0.20%.

EXAMPLE 4

A cast-coated pressure-sensitive adhesive sheet for ink jet recording was prepared in the same manner as in Example 1, except that the release coated paper having a shrinking rate of 0.25% was used in place of that having a shrinking rate of 0.20%.

COMPARATIVE EXAMPLE 1

A cast-coated pressure-sensitive adhesive sheet for ink jet recording was prepared in the same manner as in Example 1, except that the release coated paper having a shrinking rate of 0.17% was used in place of that having a shrinking rate of 0.20%.

The irreversible shrinkage factor and the shrinking rate adopted in the present invention were determined under the measurement conditions described below. Additionally, all the values determined herein are those in the CD direction. The cast-coated pressure-sensitive adhesive sheets prepared in the above Examples and Comparative Example were each examined for the extent of curling in the following way and evaluated by the criteria described below. The results obtained are shown in Table 1.

Determination of Irreversible Shrinkage Factor And Shrinking Rate

Paper samples were each placed in an environmental test room wherein the temperature and the humidity were controllable, and the humidity in the room was changed continuously in the order of 50% RH→35% RH→90% RH→35% RH while the temperature is kept at 25° C. The resultant samples were each examined for the length thereof and the water content therein at the intended humidity values by means of an extensometer having a water-content measurement function also. Additionally, the time of one cycle (35% RH→90% RH→35% RH) was adjusted to 6 hours.

The irreversible shrinkage factor (%) of the thus processed paper is defined as $[(L_1-L_2)/L_0]\times 100$, wherein $L_0$ represents the length of the paper under the humidity set at the initial stage (50% RH), $L_1$ represents the length which the paper has at the time when, during the process of moisturization (humidity change; 35% RH→90% RH), the water content in the paper comes to $M_0$ at the humidity of 50% RH, and $L_2$ represents the length which the paper has at the time when, during the process of demoisturization (humidity change; 90% RH→35% RH), the water content in the paper comes to $M_0$.

The shrinking rate (%) of the paper processed above is defined as $[(L_3-L_4)/L_0]\times 100$, wherein $L_0$ represents the length of the paper under the humidity set at the initial stage (50% RH), $L_3$ represents the length of the paper in the humidity lowered to 75% RH in the course of demoisturization (90% RH →35% RH) and $L_4$ represents the length of the paper in the humidity lowered to 60% RH in the course of demoisturization.

Evaluation Method of Curling

Printing was carried out on a recording paper sample so that a monochromatic solid area alternated with a blank area having the same width as the solid area by the use of a color ink jet printer (HP-1200 C, trade name, a product of Hewlett Packard Co.). The extent of curling caused in the printed sample after the spontaneous drying of the printed area was evaluated in three grades ⊚, ○ and X by visual observation. The grades ⊚ and ○ indicate that the extent of curling is negligible small.

TABLE 1

|  | Irreversible Shrinkage factor (%) of cast-coated recording paper (A) | Shrinking rate (%) of release coated paper (B) | \|(A) − (B)\| (%) | Extent of curling |
|---|---|---|---|---|
| Example 1 | 0.29 | 0.20 | 0.09 | ○ |
| Example 2 | 0.18 | 0.20 | 0.02 | ⊚ |
| Example 3 | 0.18 | 0.25 | 0.07 | ⊚ |
| Example 4 | 0.29 | 0.25 | 0.04 | ⊚ |
| Compar. Ex. 1 | 0.29 | 0.17 | 0.12 | X |

What is claimed is:

1. A cast-coated pressure-sensitive adhesive sheet for ink jet recording which comprises (1) a cast-coated recording paper having a recording layer provided on one side of a base paper according to a cast coating method, (2) a pressure-sensitive adhesive layer provided on the other side of the base paper and (3) a release coated paper laminated via the pressure-sensitive adhesive layer on the side opposite to the recording layer; said adhesive sheet having a difference between the two characteristic values (A) and (B) within the range of 0.00 to 0.10%, expressed in absolute value, wherein the characteristic value (A) is an irreversible shrinkage factor of the cast-coated recording paper in the CD direction determined under an environment that the relative humidity thereof is raised to 90% from 35% and then lowered to 35% and the characteristic value (B) is a shrinking rate of the release coated paper in the CD direction determined under a condition that the relative humidity of the environment is changed from 75% to 60% in the course of lowering the relative humidity from 90% to 35%.

2. A cast-coated pressure-sensitive adhesive sheet according to claim 1, wherein the irreversible shrinkage factor of the cast-coated recording paper in the CD direction is from 0.080% to 0.350%.

3. A cast-coated pressure-sensitive adhesive sheet according to claim 2, wherein the irreversible shrinkage factor of the cast-coated recording paper in the CD direction is from 0.100% to 0.300%.

4. A cast-coated pressure-sensitive adhesive sheet according to claim 1, wherein the shrinking rate of the release coated paper in the CD direction is from 0.100% to 0.350%.

5. A cast-coated pressure-sensitive adhesive sheet according to claim 4, wherein the shrinking rate of the release coated paper in the CD direction is from 0.170% to 0.270%.

6. A cast-coated pressure-sensitive adhesive sheet according to claim 1, wherein the recording layer comprises a pigment and a binder.

7. A cast-coated pressure-sensitive adhesive sheet according to claim 6, wherein the pigment is one or more of a pigment selected from the group consisting of amorphous silica, kaolin, calcium carbonate, alumina, aluminum hydroxide, magnesium carbonate, satin white, aluminum silicate, colloidal silica and montmorillonite.

8. A cast-coated pressure-sensitive adhesive sheet according to claim 6, wherein the binder is one or more of a binder selected from the group consisting of casein, soybean protein, starch, polyvinyl alcohol, carboxymethyl cellulose, a styrene-butadiene latex, an acrylic emulsion, a vinyl acetate emulsion and polyurethane.

9. A cast-coated pressure-sensitive adhesive sheet according to claim 6, wherein the recording layer has a coverage of from 5 to 30 g/m$^2$ on a solids basis.

10. A cast-coated pressure-sensitive adhesive sheet according to claim 1, wherein the difference between the two characteristic values (A) and (B) is within the range from 0.00 to 0.07%.

* * * * *